Figure 1:
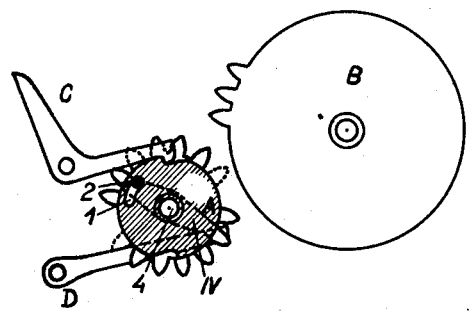

Sept. 8, 1959     K. CUPÁK     2,902,878
DISC DEVICE FOR AUTOMATICALLY SHIFTING THE
CARRIAGE OF A CALCULATING MACHINE
Filed Sept. 25, 1956

INVENTOR.
Karel Cupak
BY

United States Patent Office 2,902,878
Patented Sept. 8, 1959

2,902,878

DISC DEVICE FOR AUTOMATICALLY SHIFTING THE CARRIAGE OF A CALCULATING MACHINE

Karel Cupák, Brno, Czechoslovakia, assignor to Koh-i-noor Proseč n. Nisou, narodni podnik, Prosec nad Nisou, Czechoslovakia Application September 25, 1956, Serial No. 611,997

6 Claims. (Cl. 74—435)

This invention relates generally to a device for transmitting rotary motion between two rotatable members on parallel shafts, and is particularly directed to a rotation transmitting device adapted for use in a calculating machine to automatically shift the carriage according to the progress of a calculating operation.

In accordance with an aspect of the invention, a drive gear having teeth only on a portion of its periphery is mounted on a rotated shaft, and a rotation transmitting device is mounted on a supporting shaft extending parallel to the rotated drive shaft, such device comprising first and second parts independently rotatable on the supporting shaft with a lost motion connection therebetween, the second part of the device having a series of teeth on the periphery thereof with at least one non-toothed gap therein and detent means for normally retaining the second part in a position where the non-toothed gap faces toward the drive gear to permit rotation of the latter without effecting meshing engagement between the teeth on the drive gear and the teeth of the second part, the first part of the device having a projecting tooth for each non-toothed gap of the second part with spring means yieldably urging the first part angularly relative to the second part so that the projecting tooth of the first part occupies the corresponding non-toothed gap of the second part to be engaged by the drive gear for initially effecting turning of the second part through the lost motion connection until the teeth of the second part mesh with the teeth of the drive gear to be driven directly from the latter, and the device further comprises a releasable latch arrangement for holding the first part, against the action of the spring means, in a position where the projecting tooth thereof is remote from the non-toothed gap of the second part for interrupting the driving engagement between the drive gear and the clutch device.

Further, in accordance with an aspect of the invention, when an arrangement of the kind described above is employed in a calculating machine for automatically shifting the carriage according to the progress of a calculating operation, the second part of the device has a cam thereon which, in response to turning of the second part, controls the carriage shifting means of the calculating machine, while the releasable latch associated with the first part of the device is made to release said first part in response to an electrical or other pulse signalling the need to feed the carriage in accordance with the calculating operation being performed.

Figure 3:
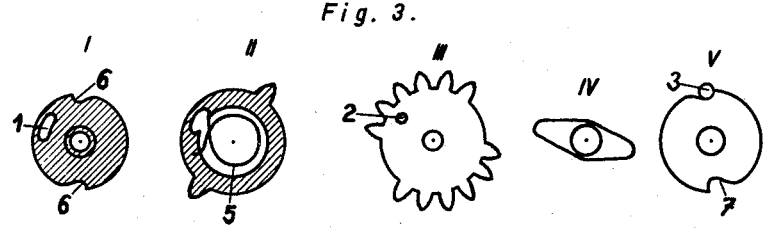

In order that the invention may be clearly understood, an illustrative embodiment thereof is hereinafter described in detail with reference to the accompanying drawing, wherein:

Fig. 1 is a side elevational view of an arrangement embodying this invention with the rotation transmitting device being shown in its basic or disengaged position;

Fg. 2 is a longitudinal or axial sectional view of both parts of the rotation transmitting device of Fig. 1, but with the individual components of the device being shown axially spaced from each other to provide a clearer view thereof; and Fig. 3 is a side elevational view of the several component parts of the rotation transmitting device.

Figure 2:
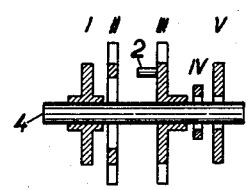

The illustrated rotation transmitting device for effecting the automatic feeding of the carriage of a calculating machine consists of two parts, namely, a first part which comprises the disc I and a ring II secured thereto (Figs. 2 and 3) and a second part comprising a gear III, a cam IV and a disc V (Figs. 2 and 3). The disc I (Fig. 3) has two diametrically opposed notches 6 formed in its circumference and adapted to receive the claw of a pawl C (Fig. 1) which may, for example, be controlled by a pulse for the feeding of the carriage of a calculating machine. Further, the disc I has an arcuate slot 1 (Figs. 1 and 3) receiving a pin 2 projecting axially from the gear III so that the slot 1 and pin 2 provide a lost motion connection between disc I and gear III.

The circumference of ring II has two diametrically opposed teeth projecting therefrom (Fig. 3).

The first part of the rotation transmitting device formed by disc I and ring II is retained in its basic or disengaged position by the claw of the pawl C (Fig. 1).

The gear III (Figs. 2 and 3) has teeth thereon having the same modulus and pitch circle diameter as the two teeth of the ring II, and two teeth are removed from each of two diametrically opposed locations on the periphery of gear III to define two non-toothed gaps which each extend over a portion of the circumference of gear III corresponding to the circumferential length of the gear occupied by two teeth and three spaces between the teeth. In the illustrated embodiment of the invention, each of the two remaining toothed portions of the gear III contains six teeth.

The pin 2 projects axially from the side of gear III facing toward the first part of the rotation transmitting device, and the two diametrically opposed cams IV are disposed at the opposite side of the gear III and are mounted in a rotational position relative to the teeth of gear III as shown in Fig. 1 in broken lines.

The disc V (Figs. 2 and 3) has two diametrically opposed notches formed in its periphery at which, in the illustrated basic disengaged position of the second part, are adapted to receive a detent roller 3 (Fig. 3). The gear III, cams IV and disc V are rigidly connected together to form a unit constituting the second part of the rotation transmitting device. Both the first and second parts of the rotation transmitting device are coaxially mounted on a supporting shaft 4 (Figs. 1 and 2) which is suitably secured to a stationary part of the machine. The first and second parts of the rotation transmitting device are freely rotatable with respect to the shaft 4, and the latter is located so that the teeth provided on the periphery of a drive gear B (Fig. 1) which is secured to the driving shaft of the machine may, during its rotation, mesh with the teeth of the gear III and of the ring II (which have the same modulus and pitch diameter), when the rotation transmitting device is manipulated from its illustrated basic or disengaged position to its engaged position.

The slot 1 of disc I is circumferentially dimensioned so that movement therein of the pin 2 allows limited rotation of the first part of the rotation transmitting device with respect to the second part thereof through an angular displacement corresponding to one pitch of the teeth thereon, that is, from an inoperative position in which the projecting teeth of ring II of the first part registers with the first teeth of the groups of teeth on gear III of the second part, to an operative position in which the projecting teeth of ring II register with the non-toothed gaps of the gear III and take the place of the first removed teeth of such gaps.

Further, both parts of the rotation transmitting device are connected by a weak torsional spring 5 (Fig. 3) mounted in the interior of the ring II and bearing, at one of its ends, against the ring II and, at its other end, against the pin 2, thereby tending to rotate the two parts relative to each other in the direction for moving the first part to its above described operative position.

The illustrated arrangement embodying this invention further includes a lever D engaged by the cam IV and adapted to be rocked by the latter in response to turning of the cam with the gear III from the basic position at which the described second part of the rotation transmitting device is held by the detent roller 3 engaging in a notch 7 of disc V. When the rotation transmitting device is employed in a calculating machine, the rockable lever D controls the feed mechanism for the carriage of the machine and is arranged to cause shifting of the carriage through half the width of a digit member of the indicator of the calculating machine in response to each rocking movement of the lever by the cam IV.

In the basic or inoperative position of both parts of the rotation transmitting device, that is, when one of the non-toothed gaps of gear III faces toward the drive gear B and the teeth of ring II are positioned out of such gaps, the teeth of the drive gear B, which are three in number in the illustrated embodiment, do not engage any of the teeth of the rotation transmitting device during rotation of the drive gear, and the rotation transmitting device remains at rest under the influence of the pawl C and the roller 3.

If, however, during a division operation, a pulse for the feed of the carriage is received by the pawl C (Fig. 1) so that the latter is withdrawn from notch 6 and releases the first part of the device, such first part is turned relative to the second part by the spring 5 to position a projecting tooth of the ring II in a non-toothed gap of the gear III, and then the teeth of drive gear B can engage that projecting tooth.

When the first part is moved by spring 5 to its operative position relative to the second part upon release of the pawl C, the pin 2 engages an end of slot 1 to form a rotational coupling between the first and second parts of the rotation transmitting device so that the engagement of the teeth of drive gear B with a projecting tooth of ring II causes turning of the second part with the first part, to bring the teeth on gear III into position for engagement by the teeth of drive gear B. Turning of the second part of the rotation transmitting device by meshing engagement of the teeth on gears III and B causes the cam IV to act on lever D which, for example, controls the carriage of a calculating machine so that the carriage is shifted through half the width of a digit member of the machine, thereby to shift the digit members from subtracting engagement to adding engagement.

Since the drive gear B has only three teeth on the periphery thereof, it is apparent that, during a revolution of the drive gear, the gear III is turned only through an angular extent corresponding to a projecting tooth of ring II and three of the teeth in a group of teeth on the gear III. During the next revolution of the drive gear B, the three teeth of the latter engage the last three teeth of the group of teeth on gear III so that the rotation transmitting device is further turned to cause the cam IV to permit return of lever D to its original position (shown in Fig. 1), for example, to shift the carriage through the remaining half of the width of a digit member and to thereby return the digit members from adding engagement to subtracting engagement and prepare the machine for a continuation of the calculating operation.

During the final turning of the gear III of the second part of the rotation transmitting device by the drive gear B, the pawl C is again urged against the disc I to be received in a notch 6 of the latter for arresting the first part of the rotation transmitting device in its inoperative position, while the gear III is further driven by gear B until the teeth of the latter move out of engagement, at which time, the detent roller 3 is received in a notch 7 of disc V to hold the second part of the device in the position shown in Fig. 1 where a non-toothed gap of gear III faces toward drive gear B and the projecting teeth of ring II are spaced angularly from the gaps of gear III to permit continued rotation of the drive gear without engagement between the teeth of the latter and the teeth of the rotation transmitting device.

Although the illustrated rotation transmitting device has been described herein with reference to an automatic division operation in a calculating machine, it is to be understood that the device may be adapted for other calculating operations or for other operations generally merely by varying the number and location of the teeth and of the non-toothed gaps of gear III, the number and location of the notches of discs I and V, and the number of nodes or high points on the cam IV. Further, although a particular structural embodiment of the invention has been described in detail herein with reference to the accompanying drawing, it is to be understood that various changes and modifications may be effected therein without departing from the scope or spirit of the invention, except as defined in the appended claims.

I claim:

1. A device for transmitting rotation from a rotated drive gear to a driven member rotatable about an axis parallel to the axis of rotation of the drive gear; said rotation transmitting device comprising a gear fixed coaxially to the driven member and having peripheral teeth engageable by the drive gear with at least one non-toothed gap between groups of said teeth, releasable means for holding said gear of the rotation transmitting device with said non-toothed gap facing toward the drive gear to permit rotation of the latter out of engagement with said peripheral teeth, a coupling member coaxial with said gear of the rotation transmitting device and having a projecting tooth for each non-toothed gap of the gear, lost motion connecting means between said gear of the rotation transmitting device and coupling member permitting the latter to turn to a limited extent relative to said gear of the rotation transmitting device between an operative position where said projecting tooth registers with the corresponding non-toothed gap and an inoperative position where said projecting tooth moves out of said corresponding gap and registers with one of said teeth of the gear adjacent said gap, releasable disengaging means for holding said coupling member in said inoperative position, and means urging said coupling member to said operative position relative to said gear of the rotation transmitting device upon release of said disengaging means so that the drive gear can then engage said projecting tooth in the corresponding gap thereby to initially turn said coupling member and said gear until said peripheral teeth of the latter are engaged by said drive gear and driven directly by the latter.

2. A device as in claim 1; wherein said coupling member has an arcuate slot therein and said lost motion connecting means includes a pin projecting axially from said gear of the rotation transmitting device and slidably received in said slot to permit turning of said coupling member to said limited extent relative to said gear.

3. A device as in claim 1; wherein said releasable means for holding said gear of the rotation transmitting device with said non-toothed gap facing toward the drive gear includes a disc rotatable with said gear of the rotation transmitting device and having a notch in the periphery thereof for each non-toothed gap, and a roller urged against the periphery of said disc to engage in said notch and arrest the rotation of said gear when said non-toothed gap of the latter faces toward the drive gear.

4. A device as in claim 1; wherein said disengaging means includes a disc rotatable with said coupling member and having a notch in the periphery thereof for each projecting tooth of said coupling member, and a rockable pawl engageable in a notch of said disc to hold said coupling member in said inoperative position relative to said gear of the rotation transmitting device when a non-toothed gap of said gear faces toward the drive gear, said pawl being disengageable from said notch to free said coupling member for limited turning relative to said gear to said operative position.

5. A device as in claim 1; wherein said driven member is in the form of a radial cam, and further comprising an operation controlling, rockable lever engaging said cam to be rocked by the latter in response to rotation of the cam with said gear of the rotation transmitting device.

6. A device as in claim 1; wherein said peripheral teeth of the gear are arranged in at least two equal groups separated by non-toothed gaps, and the number of teeth on the drive gear is divisible by a whole number into the number of teeth in each of said groups, so that, upon each release of said disengaging means, said gear of the rotation transmitting device and said driven member are turned to an angular extent corresponding to that of one of said groups.

References Cited in the file of this patent

UNITED STATES PATENTS

| | | |
|---|---|---|
| 409,149 | Kaiser | Aug. 13, 1889 |
| 1,937,326 | Pick | Nov. 28, 1933 |
| 2,376,161 | Maud et al. | May 15, 1945 |
| 2,410,643 | Fielding | Nov. 5, 1946 |